UNITED STATES PATENT OFFICE.

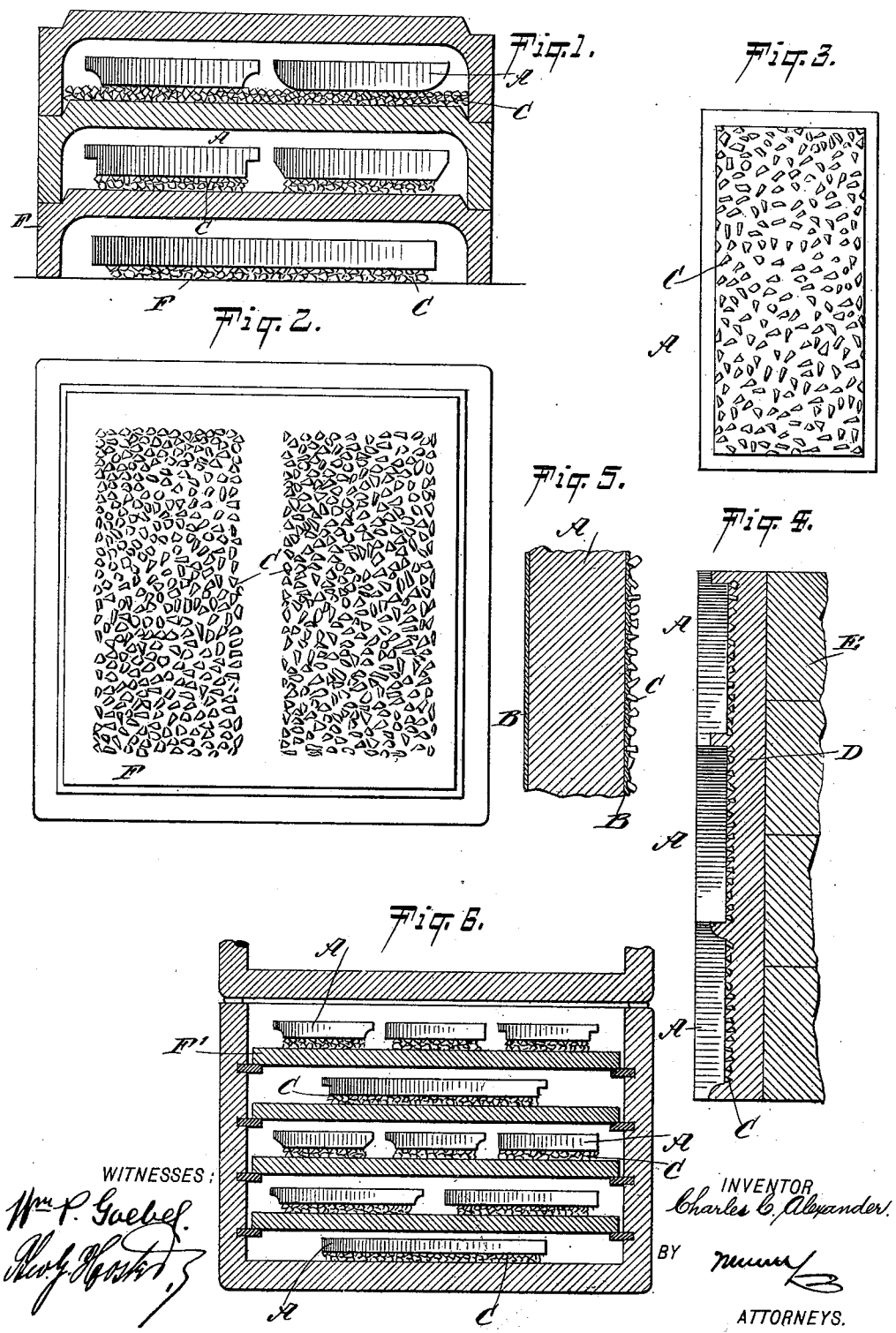

CHARLES C. ALEXANDER, OF BAYONNE, NEW JERSEY.

TILE.

SPECIFICATION forming part of Letters Patent No. 627,378, dated June 20, 1899.

Application filed February 8, 1899. Serial No. 704,902. (No model.)

*To all whom it may concern:*

Be it known that I, CHARLES C. ALEXANDER, of Bayonne, in the county of Hudson and State of New Jersey, have invented certain new and useful Improvements in Tiles, of which the following is a full, clear, and exact description.

The object of the invention is to provide certain new and useful improvements in glazed or enameled tiles, whereby crazing or cracking of the glazed or enameled surface is retarded or prevented and a large amount of tile waste is utilized for forming a rough surface on the backs of the tiles to secure an anchorage and hold the tile firmly in position by the cement or other binding material when forming a tile wall, ceiling, or floor.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1 is a sectional side elevation of a muffle for finally burning the tiles. Fig. 2 is a plan view of one of the muffle-sections. Fig. 3 is a rear face view of the tile. Fig. 4 is a cross-section of a wall with the tiles applied thereon. Fig. 5 is an enlarged cross-section of part of a tile; and Fig. 6 is a cross-section of a saggar for burning the tiles instead of in a muffle, as shown in Fig. 1.

All glazed or enameled tiles are liable to craze either before or after they are set in the embedding material. This crazing is the breaking apart of the continuous surface of the glaze and seriously prevents to a certain extent the general use of glazed or enameled tiles, as the beauty of the tiles is impaired by the crazing, and the cracks in the surface of such tiles reduce or destroy the sanitary character of the tiles. Manufacturers of tiles have been constantly striving to overcome this defect, but without success, except that they have been able to produce tiles that will not craze until after they are set in the cement bedding. The porous or absorbent back portion of the tile must be soaked in water before setting or it will not adhere to the cement and by the hydraulic action of the water and cement in and against the porous body of the tile is believed to cause the latter to craze or crack the enameled or glazed front part of the tile. The water referred to cannot evaporate through the glazed surface of the tile and must therefore be retained until it evaporates through the backing, and all or a part of these conditions ultimately result in crazing the tile. If such tiles are set against the cement without first being soaked in water, they will attract and absorb the water contained in the cement, thereby preventing the latter from hardening or setting naturally, so that the adhesiveness and set of the cement are partly destroyed.

It frequently happens in new buildings where tiles are being set that the regular water-supply has not been provided, and it is necessary to hoist water for soaking tiles from the first floor to the different upper floors. This involves considerable labor and consequent expense, which would be avoided by using tiles that do not require soaking in water. In cold weather it is often necessary to abandon the work of setting absorbent tiles in buildings that are not heated, because ice forms on the wet tiles and they freeze together. This ice will form on the tiles when the temperature is not low enough to freeze the wet cement used in setting the tiles. If the setting of the tiles is continued under such adverse conditions, then the cement will not bond properly with the tiles and the latter are certain to become loose. If absorbent tiles are not soaked sufficiently in water or are allowed to dry out too much after being soaked, they will not adhere to the cement, and owing to lack of care on the part of tile-setters in this particular much annoyance and loss has resulted from the tiles becoming loose.

Tiles are frequently set in places where the accidental spilling of water or any leakage from tubs or other receptacles upon the floors will soak through the latter and ruin the plastering and decorations on the ceilings and walls beneath, and in this way cause considerable loss directly traceable to the use of water for soaking the tiles.

In experimenting I found that when tiles are glazed upon all exposed surfaces by a complete immersion of the tiles in the glazing or enameling material previous to burning they prevent the absorption of moisture from the atmosphere or otherwise into the body of the tile, and it has been found that tiles treated in this manner are practically free from crazing. Such tiles, however, owing to the glazed back and side edges will not adhere to the cement bedding, and therefore it is not practical to set tiles manufactured in this manner.

My improved tiles, presently to be described in detail, are set dry, and as their surface is not porous they do not require soaking in water, so that all expense and risk of handling water for this purpose will be avoided, and in addition it is absolutely certain that the cement bedding will set naturally against such tiles without having its strength impaired, so that the tiles are not liable to become loose.

Each tile A consists of a body of suitable porous material covered on its entire surface with a glaze or enamel B, and from the back of the tile project small irregular pieces C, embedded in the cement or other binding material D, placed on the wall E in the usual manner when setting the tiles.

Now in order to form the tiles described I proceed as follows: The defective, broken, and discarded tiles, of which there is always an abundance in a tile factory, are ground into the small pieces C and sprinkled upon a muffle F, as shown in Fig. 1, or on a plate F', as shown in the saggar in Fig. 6, and the tiles A after being entirely covered with the glazing material B by dipping or otherwise are placed face upward upon the said pieces C, as is plainly shown in Figs. 1 and 6. The pieces or particles C are now in position between the tile and the setter or plate and will prevent the glaze or enamel on the tile from adhering to the setter or plate. The tiles in the muffle or in the open kiln or saggar are then fired to melt the glaze and cause it to adhere to the tile-body A in the usual way, and at the same time the pieces or particles C firmly and securely adhere to the glaze on the under side or back of the tiles to form a rough and irregular granulated surface that will in turn adhere securely to the cement bedding D, as above mentioned.

I prefer to use a tile having a smaller area at the back surface than on the face of the tile, so that any adhering pieces or particles C that may project over the edges of the back surface do not project beyond the faces, and hence will not prevent the tiles from abutting closely at the side edges of the tiles when forming a wall or ceiling. Great care must be exercised in making tiles having square or right-angle edges, as shown at the bottom portion of Fig. 1 and in Fig. 6, so that the pieces or particles C do not project over the said edges and by their presence prevent adjacent tiles from abutting closely when forming a wall or ceiling. It is understood, however, that ordinary tiles having such square edges can be successfully treated in the manner described without said pieces projecting beyond the side edges of the tiles; but in this case it is necessary that the pieces or particles be placed on the setter or plate in an area somewhat less than that of the face of the tile itself. When the tile is now carefully placed on the pieces, it is evident that the back surface covered with pieces is less in area than that of the front face of the tile. It is further understood that rough pieces or particles of any other material besides the one mentioned will answer the purpose, provided the said material will adhere to the glaze and will not melt or disintegrate in the intense heat of the kiln.

It is expressly understood that the broken pieces C are partly embedded in the glaze or enamel B at the back of the tile and practically fused therewith during the firing process.

When the entire surface of the setter or plate is sprinkled with pieces, as indicated at the upper portion in Fig. 1, then the tiles having a reduced back face take up only such pieces as come in contact with the enamel on the reduced surface, and consequently the pieces on the finished tile do not project beyond the side edges thereof and obstruct proper setting of the tile in the wall or ceiling.

When firing the tiles, the pieces or particles can be subjected to almost any degree of heat without melting, and consequently they do not stick to the setter or plate, but readily fuse with the enamel or glaze at the contacting parts.

Having thus fully described my invention, I claim as new and desire to secure by Letters Patent—

1. A tile having its entire surface glazed, and small pieces projecting from the glaze at the back of the tile.

2. A tile having its entire surface glazed or enameled, to render the body portion of the tile impervious, and non-glazed pieces projecting from the glaze at the back of the tile.

3. The herein-described tile composed of the interior body portion or core of porous or absorbent material, the glazing or enamel covering the entire exterior of and inclosing the body portion or core, and the small pieces or granular projections partially embedded in the glazed portion or enamel on the rear face of the tile and projecting from such face, all substantially as described, whereby the surface cracking of the tile from moisture will be avoided and the tile may properly adhere to the cement or binding material substantially as set forth.

4. A tile composed of the interior body portion or core of porous or absorbent material, the glaze or enamel covering the entire exterior of and inclosing such body portion or core, and projecting portions at the rear face of the tile adapted to afford a positive connection with the cement or binding material in which the tile may be laid substantially as set forth.

CHARLES C. ALEXANDER.

Witnesses:
   THEO. G. HOSTER,
   EVERARD BOLTON MARSHALL.